US012795659B2

(12) United States Patent
Zhu

(10) Patent No.: US 12,795,659 B2
(45) Date of Patent: Nov. 10, 2026

(54) METHOD, APPARATUS, UE, NETWORK DEVICE, AND STORAGE MEDIUM FOR DETERMINING TIME DOMAIN RESOURCE FOR UPLINK TRANSMISSION

(71) Applicant: Beijing Xiaomi Mobile Software Co., Ltd., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 525 days.

(21) Appl. No.: 18/552,798

(22) PCT Filed: Apr. 2, 2021

(86) PCT No.: PCT/CN2021/085445
§ 371 (c)(1),
(2) Date: Feb. 16, 2024

(87) PCT Pub. No.: WO2022/205472
PCT Pub. Date: Oct. 6, 2022

(65) Prior Publication Data
US 2024/0224265 A1 Jul. 4, 2024

(51) Int. Cl.
*H04W 72/1268* (2023.01)

(52) U.S. Cl.
CPC ............................... *H04W 72/1268* (2013.01)

(58) Field of Classification Search
None
See application file for complete search history.

(56) References Cited

U.S. PATENT DOCUMENTS

2013/0039305 A1* 2/2013 Kishiyama ........ H04W 72/1263 370/329
2016/0295629 A1* 10/2016 Gubeskys ............. H04W 76/16
(Continued)

FOREIGN PATENT DOCUMENTS

CN 109792746 A * 5/2019 ............ H04W 72/20
CN 111770577 A 10/2020
(Continued)

OTHER PUBLICATIONS

3GPP Draft; R1-1913660, Dec. 6, 2019, 3rd Generation Partnership Project (3GPP), Mobile Competence Centre, 650, route des Lucioles, F-06921 Sophia-Antipolis Cedex, France.

*Primary Examiner* — Walter J Divito
(74) *Attorney, Agent, or Firm* — Volpe Koenig

(57) ABSTRACT

The disclosure relates to a method, apparatus, user equipment, network device, and storage medium for determining time domain resource for uplink transmission. The method includes: monitoring, by a user equipment (UE), a scheduling grant for scheduling uplink transmission, and determining the time domain resource for uplink transmission according to a first configuration information or a first predefined rule of network side. According to the disclosure, a corresponding indication can be performed by means of downlink control information (DCI) according to configuration of a physical uplink shared channel (PUSCH) resource flexibly, such that the UE can determine a corresponding time domain resource for uplink transmission by monitoring the DCI, the UE can accurately and quickly obtain a time domain transmission position of the PUSCH, and correct transmission of uplink data of the UE can be guaranteed.

17 Claims, 4 Drawing Sheets

(56) References Cited

U.S. PATENT DOCUMENTS

| | | | |
|---|---|---|---|
| 2020/0314817 A1 | 10/2020 | Sun et al. | |
| 2022/0159706 A1* | 5/2022 | Panteleev | H04L 5/0094 |

FOREIGN PATENT DOCUMENTS

| | | |
|---|---|---|
| WO | 2019080839 A1 | 5/2019 |
| WO | 2020056752 A1 | 3/2020 |
| WO | 2020218529 A1 | 10/2020 |

* cited by examiner

METHOD, APPARATUS, UE, NETWORK DEVICE, AND STORAGE MEDIUM FOR DETERMINING TIME DOMAIN RESOURCE FOR UPLINK TRANSMISSION

CROSS REFERENCE TO RELATED APPLICATION

The present application is a U.S. National Stage of International Application No. PCT/CN2021/085445, filed on Apr. 2, 2021, the contents of all of which are incorporated herein by reference in their entireties for all purposes.

BACKGROUND

In a portion of current mobile communication systems, user equipment (UE) determines a slot sent by a physical uplink shared channel (PUSCH) as follows: in the case of fallback downlink control information (DCI), the offset from the DCI to the PUSCH is determined by 4-bit indication information in the DCI; and in the case of non-fallback DCI, the offset from the DCI to the PUSCH is indicated by a length-configurable information field in the DCI.

SUMMARY

The present disclosure relates to a method, apparatus, user equipment (UE), network device, and storage medium for determining time domain resource for uplink transmission.

Examples of the disclosure provide a method, apparatus, user equipment (UE), network device, and storage medium for determining time domain resource for uplink transmission.

According to a first aspect of the disclosure, a method for determining a time domain resource for uplink transmission is provided. The method includes: monitoring, by user equipment (UE), a scheduling grant for scheduling uplink transmission, and determining the time domain resource for uplink transmission according to a first configuration information or a first predefined rule.

According to a second aspect of the disclosure, a method for determining time domain resource for uplink transmission is provided. The method includes: sending, by a network device, a scheduling grant for indicating time domain resource for uplink transmission to UE, and sending first configuration information or a first predefined rule to the UE. Where the first configuration information or the first predefined rule is configured to indicate a manner of determining the time domain resource for uplink transmission by the UE.

According to a third aspect of the disclosure, a network device is provided. The network device includes a processor, a transceiver, a memory, and an executable program stored on the memory and executable by the processor. The processor executes steps of the method for determining time domain resource for uplink transmission in the second aspect when running the executable program.

According to a fourth aspect of the disclosure, a storage medium is provided. The storage medium stores an executable program, where the executable program implements steps of the method for determining time domain resource for uplink transmission in the first aspect or the second aspect when executed by a processor.

BRIEF DESCRIPTION OF THE DRAWINGS

The drawings here are incorporated into the description as a constituent part of the description, illustrate embodiments conforming to the disclosure, and serve to explain principles of the disclosure along with the description.

DETAILED DESCRIPTION

Description will be made in detail to examples here, instances of which are illustrated in the accompanying drawings. When the following description relates to the accompanying drawings, the same numbers in different accompanying drawings refer to the same or similar elements unless otherwise indicated. Embodiments described in the following examples do not represent all embodiments consistent with examples of the disclosure. On the contrary, they are merely instances of apparatuses and methods consistent with some aspects of the examples of the disclosure as described in detail in the appended claims.

The term used in the examples of the disclosure is for the purpose of describing particular examples merely and is not intended to limit the examples of the disclosure. As used in the examples and the appended claims of the disclosure, singular forms "a", "an" and "the" are intended to include plural forms as well, unless otherwise indicated by the context clearly. It should be understood that the term "and/or" as used here refers to and encompasses any or all possible combinations of one or more of the associated listed items.

It should be understood that although the terms of first, second, third, etc. may be employed in the examples of the disclosure to describe various information, such information should not be limited to these terms. These terms are merely used to distinguish the same type of information from each other. For instance, first information may also be referred to as second information, and similarly, second information may also be referred to as first information, without departing from the scope of the examples of the disclosure. The word "if" as used here may be construed to mean "at the time of" or "when" or "in response to determining", depending on the context.

Figure 1:
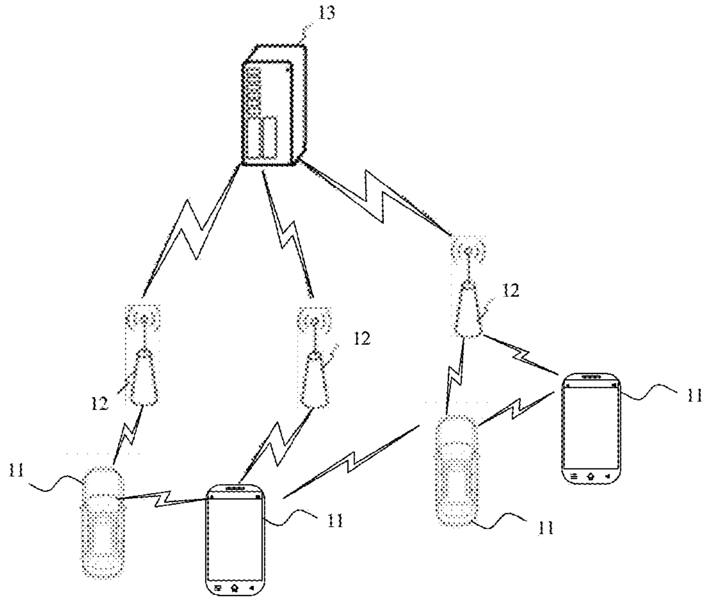
FIG. 1 is a schematic structural diagram of a radio communication system according to an example.

With reference to FIG. 1, a structural schematic diagram of a radio communication system provided in an example of the disclosure is shown. As shown in FIG. 1, the radio communication system is a communication system based on a cellular mobile communication technology. The radio communication system may include: several terminals 11 and several base stations 12.

The terminal 11 may be a device that provides speech and/or data connectivity for a user. The terminal 11 may communicate with one or more core networks by means of a radio access network (RAN). The terminal 11 may be an Internet of Things terminal, for example, a sensor device, a mobile telephone (or referred to as a "cellular" telephone), and a computer having an Internet of Things terminal, for example, may be a stationary, portable, pocket-sized, hand-held, computer-built, or vehicle-mounted device, for instance, a station (STA), a subscriber unit, a subscriber station, a mobile station, a mobile, a remote station, an access point, a remote terminal, an access terminal, a user terminal, a user agent, a user device, or user equipment (UE). Alternatively, the terminal 11 may be a device of an unmanned aerial vehicle. Alternatively, the terminal 11 may be an in-vehicle device, for instance, a trip computer with a radio communication function, or a radio communication device to which a trip computer is externally connected. Alternatively, the terminal 11 may be a roadside device, for example, a street lamp, a signal lamp, another roadside device, etc., with the radio communication function.

The base station 12 may be a network-side device in the radio communication system. The radio communication system may be the 4th generation mobile communication (4G) system, also referred to as a long term evolution (LTE) system; and alternatively, the radio communication system may also be a 5G system, also referred to as a new radio (NR) system or a 5G NR system. Alternatively, the radio communication system may also be any generation system. An access network in the 5G system may be referred to as a new generation-radio access network (NG-RAN). Alternatively, the radio communication system may be a machine-type communication (MTC) system.

The base station 12 may be an evolved Node B (eNB) used in a 4G system. Alternatively, the base station 12 may also be a next-generation Node B (gNB) using a central distributed architecture in a 5G system. When using the central distributed architecture, the base station 12 typically includes a central unit (CU) and at least two distributed units (DU). The central unit is provided with protocol stacks of a packet data convergence protocol (PDCP) layer, a radio link control (RLC) layer, and a media access control (MAC) layer; and each distributed unit is provided with a protocol stack of a physical (PHY) layer. Examples of the disclosure are not limited to the specific implementation modes of the base station 12.

A radio connection may be established between the base stations 12 and the terminals 11 by means of radio air interfaces. In different embodiments, the radio air interface is a radio air interface based on a 4th generation mobile communication network technology (4G) standard; alternatively, the radio air interface is a radio air interface based on a 5th generation mobile communication network technology (5G) standard, for example, the radio air interface is a new radio; and alternatively, the radio air interface may also be a radio air interface based on a 5G-based next generation mobile communication network technology standard.

In some examples, an end-to-end (E2E) connection may also be established between the terminals 11, for instance, vehicle-to-vehicle (V2V) communication, vehicle-to-infrastructure (V2I) communication, vehicle-to-pedestrian (V2P) communication, and other scenes in vehicle-to-everything (V2X).

In some examples, the above radio communication system may further include a network management device 13.

The several base stations 12 are each connected to the network management device 13. The network management device 13 may be a core network device in the radio communication system, for example, the network management device 13 may be a mobility management entity (MME) in an evolved packet core (EPC). Alternatively, the network management device may be another core network device, for example, a serving gateway (SGW), a public data network gateway (PGW), a policy and charging rules function (PCRF), a home subscriber server (HSS), etc. The examples of the disclosure do not limit an implementation form of the network management device 13.

In current mobile communication systems, user equipment (UE) determines a slot sent by a physical uplink shared channel (PUSCH) as follows: in the case of fallback downlink control information (DCI), the offset from the DCI to the PUSCH is determined by 4-bit indication information in the DCI; and in the case of non-fallback DCI, the offset from the DCI to the PUSCH is indicated by a length-configurable information field in the DCI. However, a current PUSCH offset indication method is inflexible, which seriously affects transmission of uplink data of the UE in the communication system.

An execution body related to the examples of the disclosure includes, but is not limited to, user equipment (UE) in a cellular mobile communication system, a base station using cellular mobile communication, etc.

Figure 2:
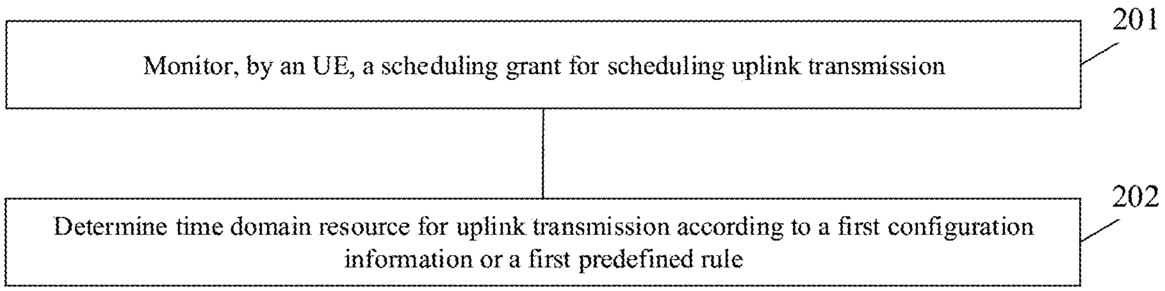
FIG. 2 is a schematic flowchart of a method for determining a time domain resource for uplink transmission according to an example.

FIG. 2 is a schematic flowchart of a method for determining time domain resource for uplink transmission according to an example. As shown in FIG. 2, an example of the disclosure is executed by UE. The method for determining time domain resource for uplink transmission in the example of the disclosure includes steps 201 and 202.

In step 201, monitor, by UE, a scheduling grant for scheduling uplink transmission.

In the example of the disclosure, the scheduling grant of the time domain resource for uplink transmission may be downlink control information (DCI).

The UE determines uplink data to be transmitted by itself by monitoring DCI sent from a network side and according to a resource indication position of the physical uplink shared channel (PUSCH) in the DCI, and transmits the uplink data by using the resource position of the PUSCH indicated by the DCI.

As an implementation mode, the step of monitoring, by UE, a scheduling grant for scheduling uplink transmission includes: monitor the scheduling grant by the UE only on restricted or partial time domain resources according to second configuration information or a second predefined rule.

In step 202, determine time domain resource for uplink transmission according to a first configuration information or a first predefined rule of network side.

In the example of the disclosure, after receiving the scheduling grant of the time domain resource for uplink transmission, the UE needs to determine the transmission time domain resource of uplink data according to the first configuration information or the first predefined rule of network side, so as to transmit the uplink data on the corresponding time domain resource.

In the example of the disclosure, the step of determining the time domain resource for uplink transmission includes: determining the time domain resource for uplink transmission based on an information field in the scheduling grant according to the first configuration information or the first predefined rule, wherein the information indicated by the information field comprises information of the time domain resource with the existing or extended value range.

Figure 3:
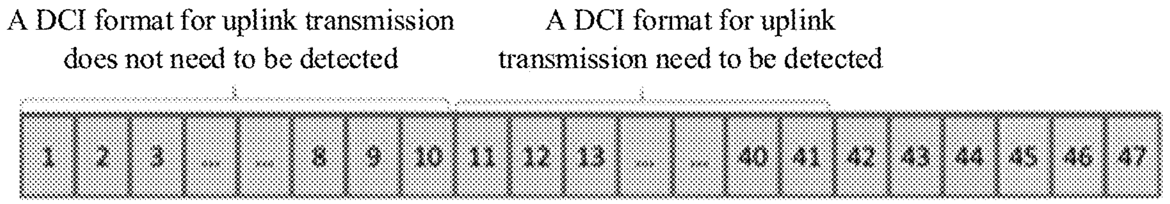
FIG. 3 is a schematic diagram of transmission slots according to an example.

K2 may be an indication range. If K2 is not extended, K2 may be configured in the UE as the first configuration information or the first predefined rule. When the UE determines that a DCI format of a slot in the DCI is a set format by monitoring the DCI, it is determined that an uplink slot in which the offset is K2 after the slot is a position of a PUSCH time-frequency resource. When K2 is extended or an indication range of K2 is extended, the extended indication range may be used as the first configuration information or the first predefined rule and sent to the UE, and the UE determines an offset according to the first configuration information or the first predefined rule. As shown in FIG. 3, in the example of the disclosure, in the design of a current PUSCH slot position indication, a K2-th slot after the slot where the scheduling grant is located is used as the PUSCH time-frequency resource, and the scheduling grant is indicated by the DCI. Since the indication range (K2) of an interval between the scheduling grant and the PUSCH time-frequency resource is restricted, a current indication range of K2 is 0-31, and there is a problem that the scheduling grant transmitted on some slots cannot indicate PUSCH transmission.

In this example, in the case that the indication range of K2 is not extended, the UE monitors the scheduling grant only on the restricted time domain resources according to the second configuration information or the second predefined rule of network side. For instance, the UE may determine its own DCI detection behavior based on the second predefined rule. The UE determines a set of downlink time domain units that cannot indicate PUSCH transmission according to frame structure information, and determines not to perform DCI format detection on uplink transmission scheduling on the set of time domain units. Alternatively, the UE receives the second configuration information sent from a base station. The second configuration information is configured to indicate a manner of detecting downlink control information by the UE. Here, the second configuration information is configured to instruct the UE to listen from a certain slot position or not to listen at some slots, instead of always monitoring the downlink slots. In other words, the UE can listen in a downlink slot region that can bear an offset of the PUSCH with respect to the current second configuration information or a preconfigured second predefined rule. In the example of the disclosure, the UE may determine the detection behavior of a terminal according to the second configuration information or the second predefined rule.

For the network side, indication of the PUSCH bearing resource is implemented by the base station, and the base station sends the uplink scheduling grant only on a slot within the range that can be indicated by K2. Here, the first configuration information includes an offset indicating the PUSCH. For instance, the UE determines that the offset is 25 slots according to the DCI format of the uplink transmission resource. In this case, if the base station determines that the PUSCH is carried in the slot 46, the base station instructs the uplink transmission resource in slot 21, and the UE determines that the PUSCH is allocated to slot 46 after finding the format of slot 21. After the network device, such as the base station, determines the offset indicated by K2, the network device notifies the UE of the offset by means of the first configuration information. Alternatively, after the offset indicated by K2 is fixed through a protocol, the offset is configured in the UE as the first predefined rule. In this way, the UE may determine the transmission time domain resource of the uplink data according to the first configuration information and/or the first predefined rule.

The UE needs to search for the DCI for the PUSCH in the corresponding time domain resource range, and does not need to detect the DCI for the uplink scheduling grant in other time domain ranges. In this case, since the UE does not need to search in all time domain resource ranges, the UE can save more power. For instance, in FIG. 3, since the indication range of K2 is 0 to 31, the base station can determine the PUSCH resource for the UE in slots 42-47, and K2 is 0 to 31. In this way, even if the PUSCH resource is configured in slot 42, the indication information can be configured in slot 11 at the earliest through K2, and accordingly, the first 10 slots cannot bear the indication information of the PUSCH. However, if the UE starts to monitor the indication information of the PUSCH resource from the first slot, it will cause unnecessary power consumption of the UE. In this case, the second configuration information or the second predefined rule may be sent to the UE, or the second configuration information or the second predefined rule may be configured in the UE in advance, such that the UE listens to the scheduling grant on restricted time domain resources indicated by the second configuration information or the second predefined rule. Thus, improving the efficiency and processing abilities of the system. With FIG. 3 as an instance, even if slot 42 is allocated to the UE as a PUSCH resource, the UE at least does not need to search for indication information of the PUSCH in the first 10 slots. Slots 1 to 41 are downlink slots, slots 42 to 44 are uplink/downlink switching slots, and can be used as downlink or uplink resources according to circumstances, and slots 45 to 47 are uplink resources.

With the offset indicated by K2 as 25 slots as an example, the UE does not need to search for indication information of the PUSCH in the first 20 slots. After the offset indicated by K2 is fixed to be 25, the base station may send the second configuration information to the UE, and does not need to search for the indication information of the PUSCH in the first 20 slots. Alternatively, a rule that it is not necessary to search for the indication information of the PUSCH in the first 20 slots is written into the UE as a second predefined rule.

As an implementation mode, the step of determining the time domain resource for uplink transmission includes: determine, when it is determined that set indication information in the scheduling grant is a set value, a first slot satisfying uplink data transmission as the time domain resource for uplink transmission according to the first configuration information or the first predefined rule.

As an implementation mode, the step of determining the time domain resource for uplink transmission includes: determining, in response to determine that a value indicated by an information field in the scheduling grant is a predefined or reserved value, the first time domain resource as the time domain resource for uplink transmission according to the first configuration information or the first predefined rule.

A special value is predefined or reserved. When there is no uplink transmission resource within the indication range of k2, the value indicated by the information field for indicating the time domain offset of the PUSCH in the DCI is the special value, and the UE determines a time domain position for transmission of this scheduled PUSCH based on a predefined rule or configuration information.

Figure 4:
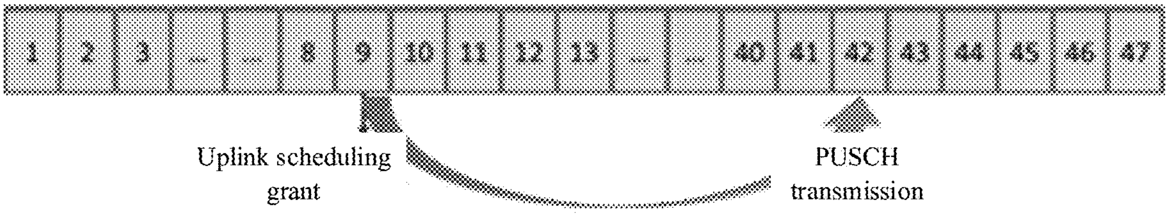
FIG. 4 is a schematic diagram of transmission slots according to an example.

In the example of the disclosure, the predefined rule is configured to determine the time domain position for transmission of the PUSCH, and the predefined rule may be that the PUSCH is transmitted on the next nearest UL slot. As shown in FIG. 4, the base station sends a scheduling grant for the PUSCH on the 9th slot. The scheduling grant is configured to transmit an uplink PUSCH, the UE determines that the value indicated by the information field for indicating the time domain offset of the PUSCH in the DCI is the special value. Then the UE transmits uplink data on the first slot satisfying a time requirement for processing uplink data transmission after the 9th slot, and sends the PUSCH for this scheduling on the first available uplink slot. That is, the PUSCH data transmission scheduled on the 9th slot is transmitted on the 42nd slot in the figure. Slots 1 to 41 are downlink slots, slots 42 to 44 are uplink/downlink switching slots, and can be used as downlink or uplink resources according to circumstances, and slots 45 to 47 are uplink resources. The special value may be 000, or other values different from the K2 information field, as long as it occupies fewer bits and the UE can accurately monitor and parse the special value.

As another implementation mode, the step of determining the time domain resource for uplink transmission includes: monitoring, when it is determined that set indication information in the scheduling grant is a set value, second indication information on subsequent time domain resources according to the first configuration information or the first predefined rule, and determining the time domain resource for uplink transmission according to the second indication information.

As another implementation mode, the step of determine the time domain resource for uplink transmission includes: monitor, in response to determined that a value indicated by an information field in the scheduling grant is a predefined or reserved value, a second indication information on another time domain resources according to the first configuration information or the first predefined rule, and determining the time domain resource for uplink transmission according to the second indication information.

Figure 5:
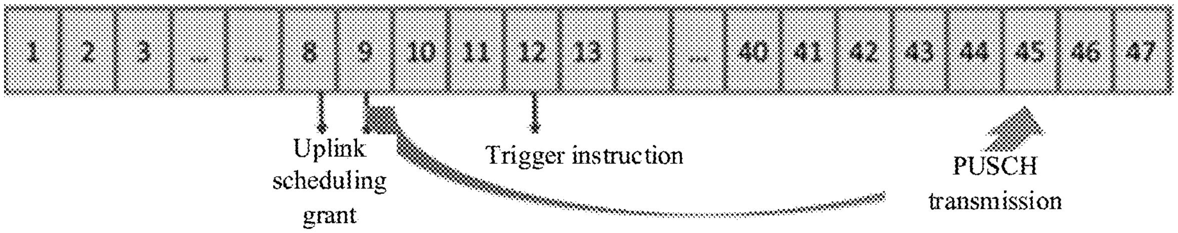
FIG. 5 is a schematic diagram of transmission slots according to an example.

A special value is predefined or reserved. When there is no uplink transmission resource within the indication range of K2, the value indicated by the information field for indicating the time domain offset of the PUSCH in the DCI is the special value, and the UE determines transmission of the PUSCH based on a predefined rule, configuration information, or a trigger instruction. As shown in FIG. 5, the base station sends a scheduling grant on the 8th and 9th slots, and the scheduling grant is configured to transmit the uplink PUSCH. The UE determines that the value indicated by the information field for indicating the time domain offset of the PUSCH in the DCI is the special value, determines to obtain a specific time domain position for transmitting the PUSCH in a subsequent certain trigger instruction, continues to monitor subsequent slots, and receives the trigger instruction on slot 12. The trigger instruction indicates a specific time domain position of uplink transmission scheduled in the uplink scheduling grant sent by the 8th and 9th slots, and the UE determines a transmission time domain resource position of the PUSCH according to the specific indication of the trigger instruction. Here, the trigger instruction on slot 12 is the second indication information. In the example, the second indication information to be transmitted in the subsequent downlink slot is indicated to the UE through the DCI. In this way, the UE may constantly monitor the downlink slot before monitoring the indication information of the offset of the PUSCH, determine the offset of the PUSCH according to the indication information of the offset of the PUSCH, and obtain a PUSCH resource position of the UE. After determining the PUSCH resource position, the UE may not need to monitor the subsequent downlink slot. It should be understood by those skilled in the art that the time domain transmission resource positions for transmissions of the PUSCH scheduled on slot 8 and slot 9 may be the same or not. Slot 8, 9, and 12 are merely illustrative, and corresponding second indication information and set indication information may also be carried by other slots.

In the example of the disclosure, as another instance of indication of PUSCH resources, a length of a set information field in the scheduling grant or an indication range of the set information field in the scheduling grant may be further extended. Specifically, the base station deploys and determines frame structure information, and extends a bit length of the information field for indicating the time domain offset of the PUSCH in the DCI information field, such that the value of K2 may be greater than 31. For instance, when a frame structure deployed by the base station includes no more than 32 consecutive downlink (DL) slots, the bit length of the information field for indicating the time domain offset from the DCI to the PUSCH may be 4 bits. If the frame structure deployed by the base station includes no more than 64 consecutive DL slots, the bit length of the information field for indicating the time domain offset from the DCI to the PUSCH may be 5 bits. Additionally, the indication range of K2 may also be extended. For instance, 2 times of a default value of K2 is used as the time domain offset of the PUSCH, when a position indicated by the offset is an uplink slot, the time domain offset is used as the time domain resource of the PUSCH, and when a slot of the indicated time domain resource of the PUSCH is an odd number, the time domain resource of the PUSCH is indicated by an offset of $2\times K2-1$. The extended rule is notified to the UE as first configuration information, or is stored in the UE as a first predefined rule. For instance, the rule written in the UE when the UE leaves the factory, such that the UE uses the transmission time domain resource indicated by the extended set indication information or the transmission time domain resource indicated by extended indication range of the indication information as the time domain resource for uplink transmission according to the first configuration information or the first predefined rule. Here, the indication range of the set indication information is extended in consideration that the DCI resource is precious. Thus, saving as much resource information as possible, and accurately indicating the PUSCH time domain resource.

In the example of the disclosure, the UE needs to determine the transmission time domain resource of uplink data according to the first configuration information or the first predefined rule of network side, so as to transmit the uplink data on the corresponding time domain resource.

The UE transmits the uplink data on the determined time domain resource for uplink transmission.

Figure 6:
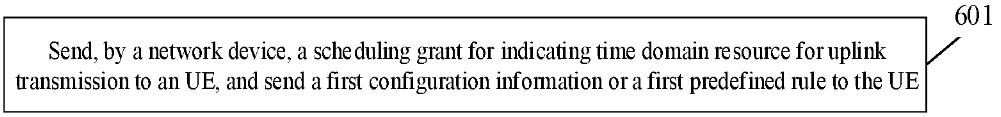
FIG. 6 is a schematic flowchart of a method for determining a time domain resource for uplink transmission according to an example.

FIG. 6 is a schematic flowchart of a method for determining time domain resource for uplink transmission according to an example. As shown in FIG. 6, the method for determining time domain resource for uplink transmission in the example of the disclosure includes step 601.

Step 601 includes sending, by a network device, a scheduling grant for indicating time domain resource for uplink transmission to UE, and sending first configuration information or a first predefined rule to the UE.

In the example of the disclosure, second configuration information or a second predefined rule is sent to the UE when the network device determines set indication information of the scheduling grant or determines that an indication range of the set indication information is not extended. Where the second configuration information or the second predefined rule is configured to indicate a time domain resource range for the UE to bear the scheduling grant.

In the example of the disclosure, second configuration information or a second predefined rule is sent to the UE when the network device determines an information field in the scheduling grant or determines that an indication range of the information field is not extended. Wherein the second configuration information or the second predefined rule is configured to indicate a time domain resource range for the UE to bear the scheduling grant.

In the example of the disclosure, the network device includes a base station, a relay station, a remote radio unit, etc.

After determining a time domain resource for transmitting the PUSCH, the network device notifies the UE of the offset information of the time domain resource of the PUSCH allocated to the UE by means of the DCI. Specifically, the PUSCH time domain resource may be indicated by extending the indication range of the offset or directly extending the information field of the indication offset of the PUSCH. In this case, the first configuration information or the first predefined rule includes extended indication information of set indication information.

In the example of the disclosure, set indication information in the scheduling grant is a set value. The first configuration information or the first predefined rule includes a manner of determining a first slot satisfying uplink data transmission as the time domain resource for uplink transmission.

In the example of the disclosure, the information field in the scheduling grant is a predefined or reserved value. And the first configuration information or the first predefined rule comprises a manner of determining the first time domain resource as the time domain resource for uplink transmission.

Alternatively, as an implementation mode, set indication information in the scheduling grant is a set value. Here, the second indication information is sent on a time domain resource after a slot bearing the set indication information; and the second indication information is configured to indicate an offset of the time domain resource for uplink transmission.

Alternatively, as another implementation mode, a value indicated by an information field of the scheduling grant is a predefined or reserved value. And second indication information is sent on a time domain resource after a slot bearing the set indication information; and the second indication information is configured to indicate an offset of the time domain resource for uplink transmission.

Here, as for a manner in which the network device sends a scheduling grant and a specific implementation mode in which the position of the PUSCH resource is determined and indicated to the UE, reference may be made to the relevant description of the foregoing examples.

Figure 7:
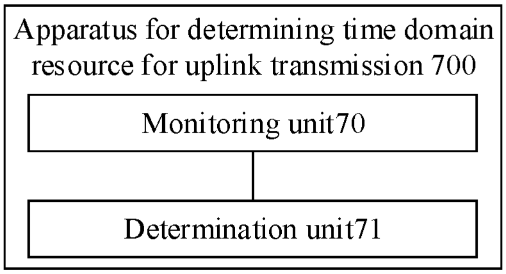
FIG. 7 is a schematic diagram of a composition structure of an apparatus for determining time domain resource for uplink transmission according to an example.

FIG. 7 is a schematic diagram of a composition structure of an apparatus for determining time domain resource for uplink transmission 700 according to an example. As shown in FIG. 7, the apparatus for determining the time domain resource for uplink transmission 700 in the example of the disclosure is applied to a UE side. The apparatus 700 includes a monitoring unit 70 and a determination unit 71.

The monitoring unit 70 is configured to monitor a scheduling grant for scheduling uplink transmission.

The determination unit 71 is configured to determine the time domain resource for uplink transmission according to a first configuration information or a first predefined rule of the network side.

In an example, the monitoring unit 70 is further configured to: monitor the scheduling grant only on restricted or partial time domain resources according to second configuration information or a second predefined rule of the network side.

In an example, the determination unit 71 is further configured to: determine, when it is determined that set indication information in the scheduling grant is a set value, a first slot satisfying uplink data transmission as the time domain resource for uplink transmission according to the first configuration information or the first predefined rule.

In an example, the determination unit 71 is further configured to: monitor, when it is determined that set indication information in the scheduling grant is a set value, second indication information on subsequent time domain resources according to the first configuration information or the first predefined rule, and determine the time domain resource for uplink transmission according to the second indication information.

In an example, correspondingly, the determination unit 71 is further configured to determine the time domain resource for uplink transmission by means of indication information in the scheduling grant according to the first configuration information or the first predefined rule, where the indication information includes information about set indication information, or an indication range of the indication information is extended.

In an example, the apparatus 700 further includes: a transmission unit (not shown in FIG. 7) configured to transmit uplink data on the determined time domain resource for uplink transmission.

In an example, the monitoring unit 70, the determination unit 71, the transmission unit, etc. may be implemented by one or more central processing units (CPU), a graphics processing unit (GPU), a baseband processor (BP), an application specific integrated circuit (ASIC), a digital signal processor (DSP), a programmable logic device (PLD), a complex programmable logic device (CPLD), a field-programmable gate array (FPGA), a general-purpose processor, a controller, a micro controller unit (MCU), a microprocessor, or other electronic components, and may also be implemented in combination with one or more radio frequency (RF) antennas, so as to execute steps of the method for determining time domain resource for uplink transmission in the foregoing examples.

In the example of the disclosure, particular ways in which the various units in the apparatus for determining time domain resource for uplink transmission 700 execute operations in FIG. 7 have been described in detail in the examples relating to the method, and will not be described in detail here.

Figure 8:
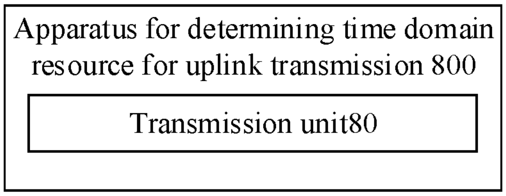
FIG. 8 is a schematic diagram of a composition structure of an apparatus for determining time domain resource for uplink transmission according to an example.

FIG. 8 is a schematic diagram of a composition structure of an apparatus for determining time domain resource for uplink transmission 800 according to an example. As shown in FIG. 8, the apparatus for determining the time domain resource for uplink transmission 800 according to the example of the disclosure is applied to the network device side. The apparatus 800 includes a sending unit 80.

The sending unit 80 is configured to send a scheduling grant for indicating the time domain resource for uplink transmission to UE, and send first configuration information or a first predefined rule to the UE. Where the first configuration information or the first predefined rule is configured to indicate a manner of determining the time domain resource for uplink transmission by the UE.

As an implementation mode, the sending unit 80 is further configured to: send second configuration information or a second predefined rule to the UE when set indication information of the scheduling grant is determined or it is determined that an indication range of the set indication information is not extended. Where the second configuration information or the second predefined rule is configured to instruct the UE to bear a time domain resource range of the scheduling grant.

As an implementation mode, the set indication information in the scheduling grant is a set value; and the first configuration information or the first predefined rule includes a manner of determining a first slot satisfying uplink data transmission as the time domain resource for uplink transmission.

As an implementation mode, the sending unit 80 is further configured as follows: set indication information in the scheduling grant is a set value, and second indication information is sent on a time domain resource after a slot bearing the set indication information; and the second indication information is configured to indicate an offset of the time domain resource for uplink transmission.

On the basis of the apparatus for determining time domain resource for uplink transmission 800 shown in FIG. 8, the apparatus for determining time domain resource for uplink transmission in the example of the disclosure further includes: an extension unit (not shown in FIG. 8) configured to extend a length of a set information field in the scheduling grant or extend a range indicated by the set information field in the scheduling grant. Where the first configuration information or the first predefined rule includes extended indication information of set indication information.

In an example, the sending unit 80, the extension unit, etc. may be implemented by one or more central processing units (CPU), a graphics processing unit (GPU), a baseband processor (BP), an application specific integrated circuit (ASIC), a digital signal processor (DSP), a programmable logic device (PLD), a complex programmable logic device (CPLD), a field-programmable gate array (FPGA), a general-purpose processor, a controller, a micro controller unit (MCU), a microprocessor, or other electronic components, and may also be implemented in combination with one or more radio frequency (RF) antennas, so as to execute the steps of the method for determining time domain resource for uplink transmission in the foregoing examples.

In the example of the disclosure, particular ways in which the various units in the apparatus for determining time domain resource for uplink transmission execute operations 800 in FIG. 8 have been described in detail in the examples relating to the method, and will not be described in detail here.

Figure 9:
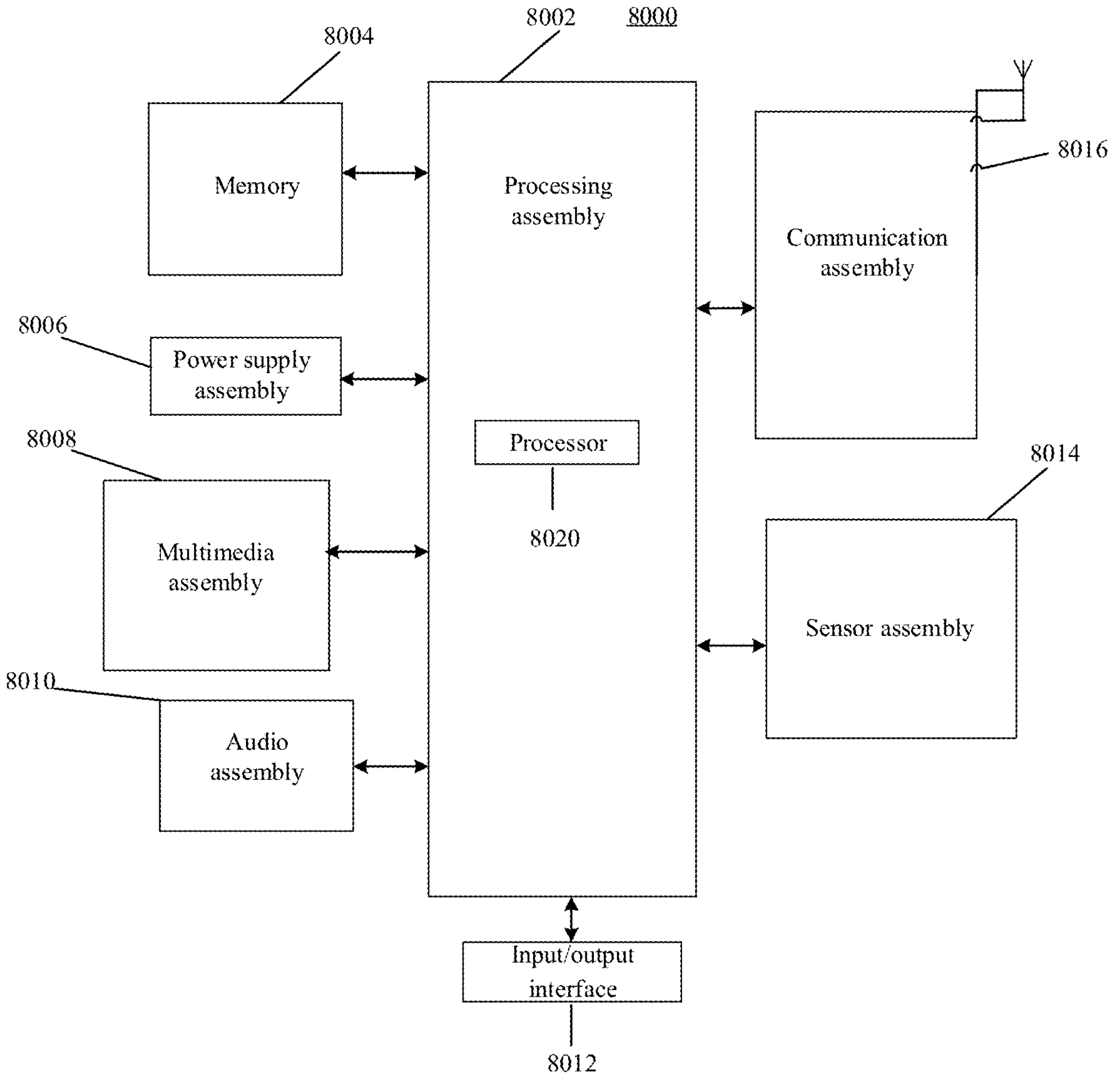
FIG. 9 is a schematic diagram of a composition structure of user equipment according to an example.

FIG. 9 is a block diagram of user equipment 8000 according to an example. For instance, the user equipment 8000 may be a mobile phone, a computer, a digital broadcast terminal, a messaging device, a gaming console, a tablet device, a medical device, a fitness device, a personal digital assistant, etc.

With reference to FIG. 9, the user equipment 8000 may include one or more of a processing assembly 8002, a memory 8004, a power supply assembly 8006, a multimedia assembly 8008, an audio assembly 8010, an input/output (I/O) interface 8012, a sensor assembly 8014, and a communication assembly 8016.

The processing assembly 8002 generally controls overall operation of the user equipment 8000, for instance, operations associated with display, phone calls, data communications, camera operations, and recording operations. The processing assembly 8002 may include one or more processors 8020 to execute an instruction to complete all or part of the steps of the method above. Moreover, the processing assembly 8002 may include one or more modules to facilitate interaction between the processing assembly 8002 and other assemblies. For instance, the processing assembly 8002 may include the multimedia module to facilitate interaction between the multimedia assembly 8008 and the processing assembly 8002.

The memory 8004 is configured to store various types of data to support operation on the equipment 8000. Instances of such data include an instruction operated on the user equipment 8000 for any application or method, contact data, phonebook data, messages, pictures, video, etc. The memory 8004 may be implemented by any types of volatile or non-volatile memory apparatus, or their combination, for instance, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply assembly 8006 supplies power to the various assemblies of the user equipment 8000. The power supply assembly 8006 may include a power management system, one or more power supplies, and other assemblies associated with power generation, management, and distribution for the user equipment 8000.

The multimedia assembly 8008 includes a screen that provides an output interface between the user equipment 8000 and the user. In some examples, the screen may include a liquid crystal display (LCD) and a touch panel (TP). In the case that the screen includes a touch panel, the screen may be implemented as a touch screen, so as to receive an input signal from a user. The touch panel includes one or more touch sensors to sense touches, slides, and gestures on the touch panel. The touch sensor may not only sense a boundary of a touch or swipe action, but also detect duration and pressure related to the touch or swipe operation. In some examples, the multimedia assembly 8008 includes a front-facing camera and/or a rear-facing camera. When the equipment 8000 is in an operational mode, for instance, a photographing mode or a video mode, the front-facing camera and/or the rear-facing camera may receive external multimedia data. Each of the front-facing camera and the rear-facing camera may be a fixed optical lens system or have a focal length and optical zoom capability.

The audio assembly 8010 is configured to output and/or input audio signals. For instance, the audio assembly 8010 includes a microphone (MIC) configured to receive an external audio signal when the user equipment 8000 is in the operational mode, for instance, a calling mode, a recording mode, and a speech recognition mode. The received audio signal may be further stored in the memory 8004 or transmitted via the communication assembly 8016. In some examples, the audio assembly 8010 further includes a speaker for outputting an audio signal.

The interface 8012 for I/O provides an interface between the processing assembly 8002 and a peripheral interface module, such as a keyboard, a click wheel, a button, etc. These buttons may include, but are not limited to, a home button, a volume button, a start button, and a lock button.

The sensor assembly 8014 includes one or more sensors for providing state assessments of various aspects for the user equipment 8000. For instance, the sensor assembly 8014 may detect an on/off state of the equipment 8000 and relative positioning of the assemblies. For instance, the assemblies are a display and a keypad of the user equipment 8000. The sensor assembly 8014 may also detect a change in position of the user equipment 8000 or an assembly of the user equipment 8000, the presence or absence of contact between the user and the user equipment 8000, orientation or acceleration/deceleration of the user equipment 8000, and temperature variation of the user equipment 8000. The sensor assembly 8014 may include a proximity sensor configured to detect the presence of a nearby object in the absence of any physical contact. The sensor assembly 8014 may also include a light sensor, for instance, a complementary metal oxide semiconductor (CMOS) or charge-coupled device (CCD) image sensor, for use in imaging applications. In some examples, the sensor assembly 8014 may also include an acceleration sensor, a gyroscopic sensor, a magnetic sensor, a pressure sensor, or a temperature sensor.

The communication assembly 8016 is configured to facilitate communications between the user equipment 8000 and other devices in a wired or wireless mode. The user equipment 8000 may access a wireless network based on a communication standard, for instance, Wi-Fi, 2G, or 3G, or a combination of them. In an example, the communication assembly 8016 receives a broadcast signal or broadcast-related information from an external broadcast management system by means of a broadcast channel. In an example, the communication assembly 8016 also includes a near field communication (NFC) module to facilitate short-range communication. For instance, the NFC module may be implemented based on a radio frequency identification (RFID) technology, an infrared data association (IrDA) technology, an ultra wide band (UWB) technology, a Bluetooth (BT) technology, or other technologies.

In an example, the user equipment 8000 may be implemented by one or more application specific integrated circuits (ASIC), a digital signal processor (DSP), a digital signal processing device (DSPD), a programmable logic device (PLD), a field programmable gate array (FPGA), a controller, a microcontroller, a microprocessor, or other electronic elements for executing the steps of the method for determining time domain resource for uplink transmission.

In an example, further provided is a non-transitory computer-readable storage medium including an instruction, for instance, a memory 8004 including an instruction, and the instruction may be executed by the processor 8020 of the user equipment 8000 so as to execute the steps of the method for determining time domain resource for uplink transmission. For instance, the non-transitory computer-readable storage medium may be a read-only memory (ROM), a random access memory (RAM), a compact disc read-only memory (CD-ROM), a magnetic tape, a floppy disk, an optical data storage apparatus, etc.

The example of the disclosure further provides a network device, including a processor, a transceiver, a memory, and an executable program stored on the memory and executable by the processor. The processor executes the steps of the method for determining the time domain resource for uplink transmission in the foregoing example when running the executable program.

The example of the disclosure further provides user equipment, including a processor, a transceiver, a memory, and an executable program stored on the memory and executable by the processor. The processor executes the steps of the method for determining the time domain resource for uplink transmission in the foregoing example when running the executable program.

The example of the disclosure further provides a storage medium storing an executable program. The executable program implements the steps of the method for determining the time domain resource for uplink transmission when executed by a processor.

1. A method for determining time domain resource for uplink transmission, including: monitoring, by a user equipment (UE), a scheduling grant for scheduling uplink transmission, and determining the time domain resource for uplink transmission according to a first configuration information or a first predefined rule.

2. The method according to 1, wherein the monitoring, by the UE, a scheduling grant for scheduling uplink transmission comprises: monitoring the scheduling grant by the UE only on restricted time domain resources according to a second configuration information or a second predefined rule.

3. The method according to 1, wherein the determining the time domain resource for uplink transmission comprises: determining, in response to determining that a value indicated by an information field in the scheduling grant is a predefined or reserved value, the first time domain resource after receiving the scheduling grant as the time domain resource for uplink transmission according to the first configuration information or the first predefined rule.

4. The method according to 1, wherein the determining the time domain resource for uplink transmission comprises: monitoring, in response to determined that a value indicated by an information field in the scheduling grant is a predefined or reserved value, a second indication information on another time domain resources according to the first configuration information or the first predefined rule, and determining the time domain resource for uplink transmission according to the second indication information.

5. The method according to 1, wherein the determining the time domain resource for uplink transmission comprises: determining the time domain resource for uplink transmission based on an information field in the scheduling grant according to the first configuration information or the first predefined rule, wherein the information indicated by the information field comprises information of the time domain resource with the existing or extended value range.

6. The method according to 1, further including: transmitting, by the UE, uplink data on the determined time domain resource for uplink transmission.

7. A method for determining time domain resource for uplink transmission, including: sending, by a network device, a scheduling grant for indicating time domain resource for uplink transmission to a UE, and sending a first configuration information or a first predefined rule to the UE, wherein the first configuration information or the first predefined rule is configured to indicate a manner of determining the time domain resource for uplink transmission by the UE.

8. The method according to 7, further including: sending a second configuration information or a second predefined rule to the UE when the network device determines an information field in the scheduling grant or determines that an indication range of the information field is not extended, wherein the second configuration information or the second predefined rule is configured to indicate a time domain resource range for the UE to bear the scheduling grant.

9. The method according to 7, wherein the information field in the scheduling grant is a predefined or reserved value; and the first configuration information or the first predefined rule comprises a manner of determining the first time domain resource after receiving the scheduling grant as the time domain resource for uplink transmission.

10. The method according to 7, wherein a value indicated by an information field of the scheduling grant is a predefined or reserved value, and second indication information is sent on time domain resource after a slot bearing the set indication information; and the second indication information is configured to indicate an offset of the time domain resource for uplink transmission.

11. The method according to 7, further including: extending a length of an information field in the scheduling grant or extending a range indicated by the information field in the scheduling grant, wherein the first configuration information or the first predefined rule comprises an extended indication information of the information field.

12. A User equipment (UE), including a processor, a transceiver, a memory, and executable program stored on the memory and executable by the processor, when the executable program is executed by the processor, causing the processor to: monitor, by the user equipment (UE), a scheduling grant for scheduling uplink transmission, and determining the time domain resource for uplink transmission according to a first configuration information or a first predefined rule.

13. The User equipment according to 12, wherein the monitor, by the UE, a scheduling grant for scheduling uplink transmission comprises: monitor the scheduling grant by the UE only on restricted time domain resources according to a second configuration information or a second predefined rule.

14. The User equipment according to 12, wherein determining the time domain resource for uplink transmission comprises: determining, in response to determining that a set indication information in the scheduling grant is predefined or reserved, the first slot satisfying uplink data transmission as the time domain resource for uplink transmission according to the first configuration information or the first predefined rule.

15. The User equipment according to 12, wherein the determine the time domain resource for uplink transmission comprises: monitor, in response to determined that a value indicated by an information field in the scheduling grant is a predefined or reserved value, a second indication information on another time domain resources according to the first configuration information or the first predefined rule, and determining the time domain resource for uplink transmission according to the second indication information.

16. The User equipment according to 12, wherein determining the time domain resource for uplink transmission comprises: determining the time domain resource for uplink transmission based on an information field in the scheduling grant according to the first configuration information or the first predefined rule, wherein the information indicated by the information field comprises information of the time domain resource with the existing or extended value range.

17. The User equipment according to 12, when the executable program is executed by the processor, further causing the processor to: transmit, by the UE, uplink data on the determined time domain resource for uplink transmission.

18. A network device, including a processor, a transceiver, a memory, and an executable program stored on the memory and executable by the processor, wherein the processor executes steps of the method for determining time domain resource for uplink transmission according to 7 when running the executable program.

19. A storage medium, storing an executable program, wherein when the executable program is executed by a processor, the steps of the method for determining time domain resource for uplink transmission according to 1 are implemented.

20. A storage medium, storing an executable program, wherein when the executable program is executed by a processor, the steps of the method for determining time domain resource for uplink transmission according to 7 are implemented.

According to the method and apparatus for determining time domain resource for uplink transmission, user equipment, a network device, and a storage medium in the examples of the disclosure, a plurality of indication methods for scheduling time domain resource for uplink transmission are provided. A corresponding indication can be performed based on downlink control information (DCI) according to configuration of a physical uplink shared channel (PUSCH) resource flexibly, such that the UE can determine a corresponding time domain resource for uplink transmission by monitoring to the DCI, the UE can accurately and quickly obtain a time domain transmission position of the PUSCH, and a correct transmission of uplink data of the UE can be guaranteed.

Other implementation solutions of the examples of the disclosure will readily occur to those skilled in the art upon consideration of the specification and practical disclosure. The present application is intended to cover any variations, uses, or adaptations of the examples of the disclosure, and these variations, uses, or adaptations follow general principles of the examples of the disclosure and include common general knowledge or customary technical means in the technical field not disclosed in the examples of the disclosure. The specification and examples are considered as illustrative merely, and a true scope and spirit of the examples of the disclosure are indicated by the following claims.

It should be understood that the examples of the disclosure are not limited to the precise structure that has been described above and shown in the accompanying drawings, and that various modifications and changes may be made without departing from the scope of the examples of the disclosure. The scope of the examples of the disclosure is limited merely by the appended claims.

What is claimed is:

1. A method for determining time domain resource for an uplink transmission, comprising:

monitoring, by user equipment (UE), a scheduling grant for scheduling the uplink transmission; and determining the time domain resource for the uplink transmission according to first configuration information or a first predefined rule;

wherein determining the time domain resource for the uplink transmission according to the first configuration information or the first predefined rule comprises:

determining the time domain resource for the uplink transmission based on an information field in the scheduling grant according to the first configuration information or the first predefined rule, wherein information indicated by the information field comprises information of the time domain resource, and the information of the time domain resource comprises information for extending a length of the information field or information for extending a range indicated by the information field.

2. The method for determining time domain resource for an uplink transmission according to claim 1, wherein monitoring, by the UE, the scheduling grant for scheduling the uplink transmission comprises:

monitoring the scheduling grant by the UE only on restricted time domain resources according to second configuration information or a second predefined rule, wherein the restricted time domain resources are a time domain resource range for the UE to bear the scheduling grant.

3. The method for determining time domain resource for an uplink transmission according to claim 1, wherein determining the time domain resource for the uplink transmission comprises:

determining, in response to determining that a value indicated by an information field in the scheduling grant is a predefined value or a reserved value, a first slot satisfying the uplink data transmission as the time domain resource for the uplink transmission according to the first configuration information or the first predefined rule.

4. The method for determining time domain resource for an uplink transmission according to claim 1, wherein determining the time domain resource for the uplink transmission comprises:

monitoring, in response to determining that a value indicated by an information field in the scheduling grant is a predefined value or a reserved value, second indication information on other time domain resources according to the first configuration information or the first predefined rule, wherein the second indication information is configured to indicate an offset of the time domain resource for the uplink transmission; and determining the time domain resource for the uplink transmission according to the second indication information.

5. The method for determining time domain resource for an uplink transmission according to claim 1, further comprising:

transmitting, by the UE, uplink data on the determined time domain resource for the uplink transmission.

6. A method for determining time domain resource for an uplink transmission, comprising:

sending, by a network device, a scheduling grant for indicating time domain resource for the uplink transmission to user equipment (UE); and sending first configuration information or a first predefined rule to the UE, wherein the first configuration information or the first predefined rule is configured to indicate a manner of determining the time domain resource for the uplink transmission by the UE; and extending a length of an information field in the scheduling grant or extending a range indicated by the information field in the scheduling grant, wherein the first configuration information or the first predefined rule comprises extended indication information of the information field.

7. The method for determining time domain resource for an uplink transmission according to claim 6, further comprising:

sending second configuration information or a second predefined rule to the UE on a condition that the network device determines an information field in the scheduling grant or determines that an indication range of the information field is not extended, and wherein the second configuration information or the second predefined rule is configured to indicate a time domain resource range for the UE to bear the scheduling grant.

8. The method for determining time domain resource for an uplink transmission according to claim 6, wherein the information field in the scheduling grant is a predefined value or a reserved value; and the first configuration information or the first predefined rule comprises a manner of determining a first slot satisfying the uplink data transmission as the time domain resource for the uplink transmission.

9. The method for determining time domain resource for an uplink transmission according to claim 6, wherein a value indicated by an information field of the scheduling grant is a predefined value or a reserved value, and second indication information is sent on the time domain resource after a slot bearing the information field; and the second indication information is configured to indicate an offset of the time domain resource for the uplink transmission.

10. A user equipment (UE), comprising a processor, a transceiver, a memory, and executable program stored on the memory and executable by the processor, the executable program is executed by the processor, causing the processor to:

monitor, by the UE, a scheduling grant for scheduling an uplink transmission; and determine a time domain resource for the uplink transmission according to first configuration information or a first predefined rule;

wherein determining the time domain resource for the uplink transmission according to the first configuration information or the first predefined rule comprises:

determining the time domain resource for the uplink transmission based on an information field in the scheduling grant according to the first configuration information or the first predefined rule, wherein information indicated by the information field comprises information of the time domain resource, and the information of the time domain resource comprises information for extending a length of the information field or information for extending a range indicated by the information field.

11. The user equipment according to claim 10, wherein monitoring, by the UE, the scheduling grant for scheduling the uplink transmission comprises:

monitoring the scheduling grant by the UE only on restricted time domain resources according to second configuration information or a second predefined rule, wherein the restricted time domain resources are a time domain resource range for the UE to bear the scheduling grant.

12. The user equipment according to claim 10, wherein determining the time domain resource for the uplink transmission comprises:

determining, in response to determining that a value indicated by the information field in the scheduling grant is a predefined value or a reserved value, a first slot satisfying the uplink data transmission as the time domain resource for the uplink transmission according to the first configuration information or the first predefined rule.

13. The user equipment according to claim 10, wherein determining the time domain resource for uplink transmission comprises:

monitoring, in response to determining that a value indicated by an information field in the scheduling grant is a predefined value or a reserved value, second indication information on other time domain resources according to the first configuration information or the first predefined rule, wherein the second indication information is configured to indicate an offset of the time domain resource for the uplink transmission; and determining the time domain resource for the uplink transmission according to the second indication information.

14. The user equipment according to claim 10, the executable program further causes the processor to:

transmit, by the UE, uplink data on the determined time domain resource for the uplink transmission.

15. A network device, comprising a processor, a transceiver, a memory, and an executable program stored on the memory and executable by the processor, wherein the processor executes steps of the method for determining the time domain resource for the uplink transmission according to claim 6, when running the executable program.

16. A non-transitory computer readable storage medium, storing an executable program, wherein the executable program is executed by a processor, such that steps of the method for determining the time domain resource for the uplink transmission according to claim 1 are implemented.

17. A non-transitory computer readable storage medium, storing an executable program, wherein the executable program is executed by a processor, such that steps of the method for determining the time domain resource for the uplink transmission according to claim 6, are implemented.

* * * * *